(12) United States Patent
Smith

(10) Patent No.: US 6,231,030 B1
(45) Date of Patent: May 15, 2001

(54) MINIMAL TOPSOIL DISTURBANCE LOG SKIDDER

(76) Inventor: Robert C. Smith, 18 Moutain View La., Vergennes, VT (US) 05491

( * ) Notice: Subject to any disclaimer, the term of this patent is extended or adjusted under 35 U.S.C. 154(b) by 0 days.

(21) Appl. No.: 09/570,020

(22) Filed: May 12, 2000

(51) Int. Cl.[7] ....................................................... B66D 1/00
(52) U.S. Cl. .......................... 254/324; 254/325; 254/334; 414/460
(58) Field of Search .................................... 254/323, 324, 254/325, 334; 414/460

(56) References Cited

U.S. PATENT DOCUMENTS

| | | | | |
|---|---|---|---|---|
| 878,512 | * | 2/1908 | Emerson | 414/460 |
| 891,385 | * | 6/1908 | Strange | 414/460 |
| 1,887,965 | * | 11/1932 | Stoner | 254/323 |
| 2,571,361 | * | 10/1951 | Harmanson | 414/546 |
| 3,625,267 | * | 12/1971 | Welborn | 144/24.12 |
| 3,841,093 | * | 10/1974 | Thompson et al. | 254/325 |
| 3,841,507 | * | 10/1974 | Barwise | 414/569 |
| 3,850,304 | * | 11/1974 | Howell | 414/569 |
| 3,973,754 | * | 8/1976 | Chadwick, Jr. | 254/323 |
| 4,685,855 | * | 8/1987 | Celli | 414/460 |
| 4,708,251 | * | 11/1987 | Picard et al. | 414/460 |
| 5,876,017 | * | 3/1999 | Morrissey | 254/323 |

FOREIGN PATENT DOCUMENTS

1121314 * 4/1982 (CA) ................................... 254/325

* cited by examiner

*Primary Examiner*—Emmanuel M. Marcelo
(74) *Attorney, Agent, or Firm*—Peter Gibson

(57) ABSTRACT

A two wheeled trailed vehicle intended to be towed by a conventional frontal hitch attachment to the rear of an all terrain vehicle (ATV) or other relatively lightweight four wheel drive vehicle has a fixed, rigid, rear vertical hoist supporting an electric winch operated lift cable run through a snatch block at the top end of the hoist. Power is supplied by either a battery or other suitable source such as a small gasoline powered electrical generator on board the two wheeled vehicle and the winch is preferably controlled remotely as well as manually. A cinch attached at either end to a pair of lateral support points well below the snatch block is utilized to secure the end of the load elevated with operation of the winch upon the lift cable through the snatch block and attached to a choker chain which is removed after the load has been taken up by the cinch. This transfers the load upon the vehicle from a central position on the top of the hoist to the lower laterally spaced apart support points for the cinch. It is suggested that relatively high pressure mobile home type tires be utilized so that only two relatively smooth grooved tread tires will suffice to carry the load. A horizontal 'A' frame and rigidly braced hoist construction in welded steel is recommended along with particulars regarding the hoist structure, cinch attachment, and various arrangements of the components upon the horizontal frame.

22 Claims, 3 Drawing Sheets

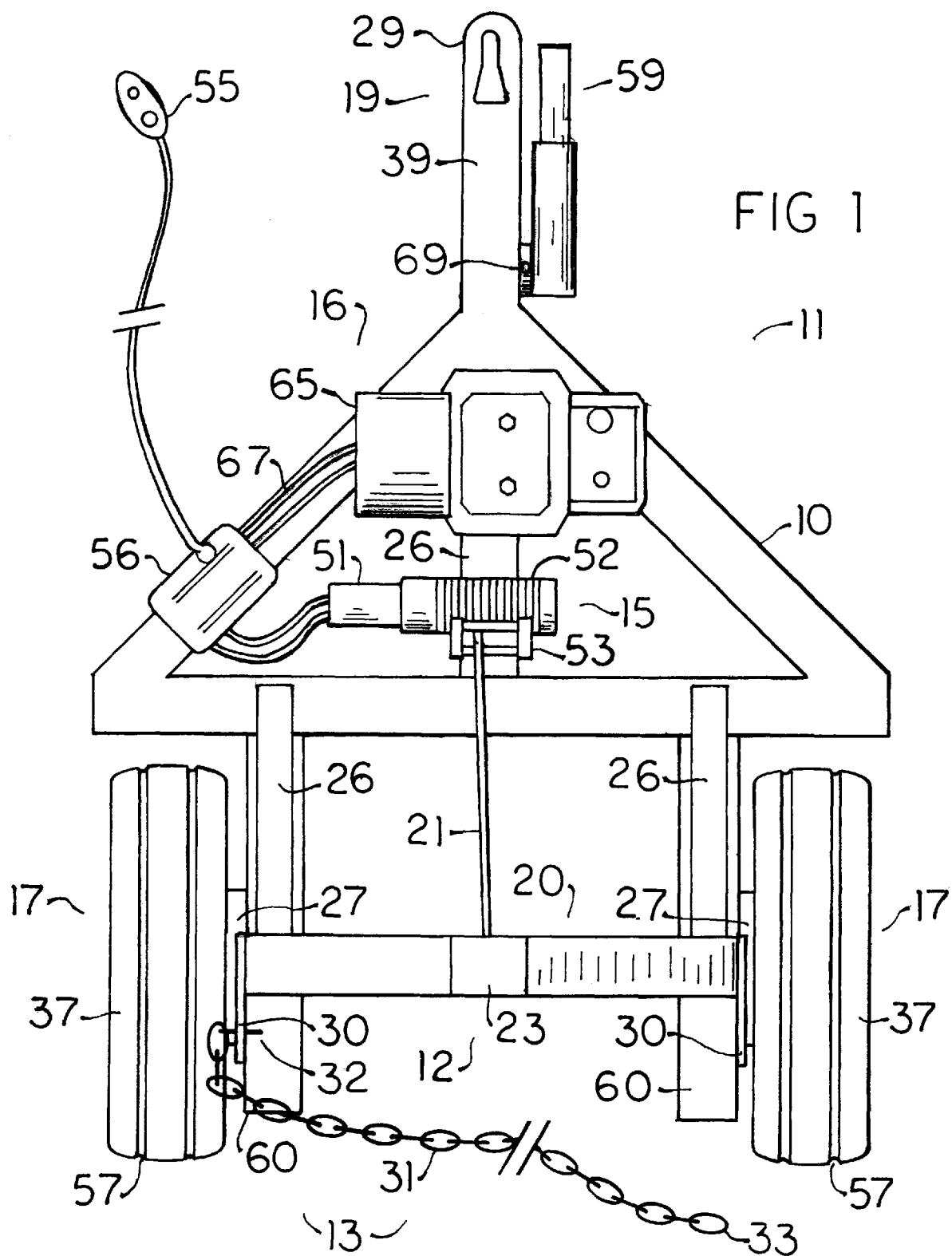

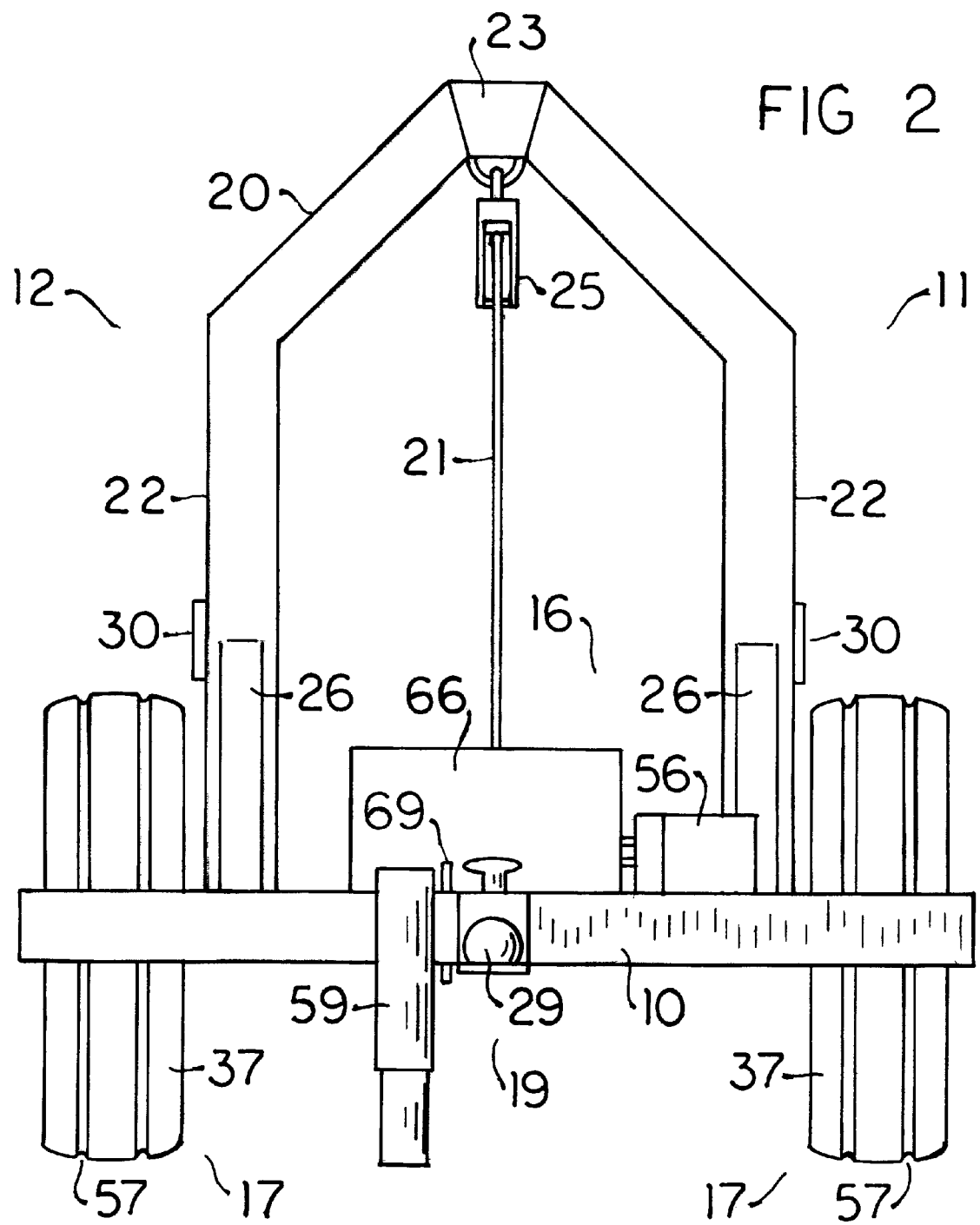

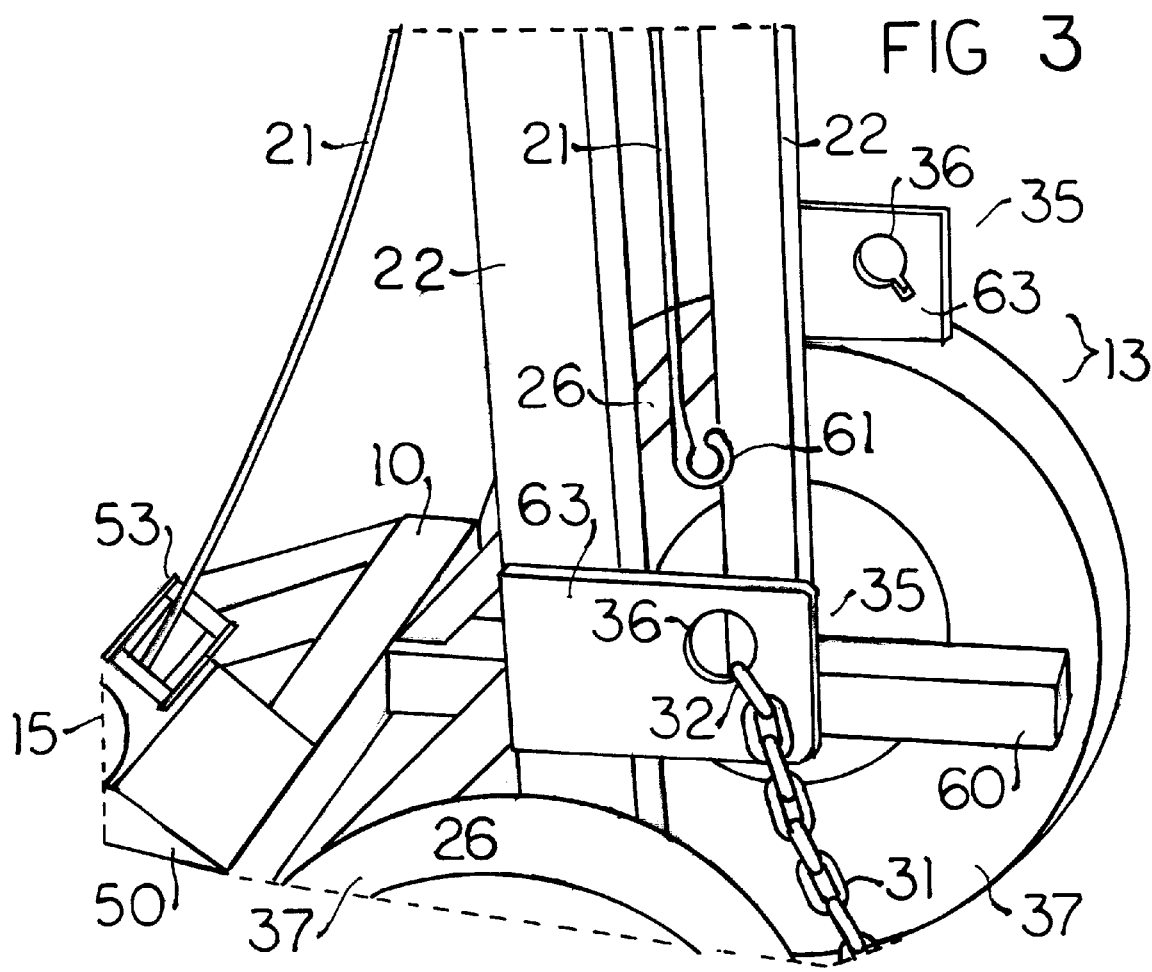
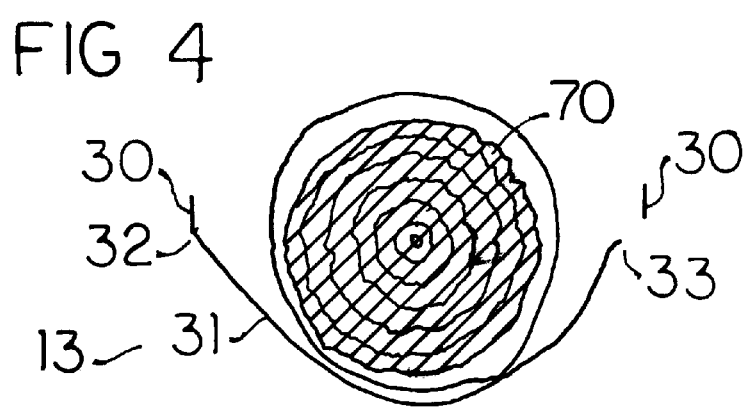

MINIMAL TOPSOIL DISTURBANCE LOG SKIDDER

BACKGROUND OF THE INVENTION

Field of the Invention

The present invention relates generally to log skidders utilized in the removal of logs by first hoisting one end of a group of logs and then dragging the load, more particularly to trailed single axis wheeled log skidders, and most specifically to trailed single axis wheeled log skidders utilizing an electric winch with the power supply on board in cooperation with a fixed, rigid, substantially vertical hoist support frame.

GENERAL BACKGROUND

Log skidders are first considered in two fundamental groups: (a) self powered; and (b) trailed. Conventional self powered type log skidders are generally comprised of a comparatively massive and powerful vehicle typically utilizing a pivoted hoist or boom operated by a hydraulic cylinder. Conventional trailed type log skidders also typically possess a pivoted hoist or boom operated by a hydraulic cylinder. Both self powered and trailed conventional type log skidders further typically use a pivoting rigid grapple to grasp one end of a group of logs and simply drag this load by the grapple after retraction of the boom effecting elevation of the load. And both types of conventional log skidders are further generally characterized by either comprising, or being suited for operation in conjunction with, an off road tractor possessing large driven wheels fitted with tires possessing a protruding tread intended to provide considerable traction in loose soil by digging into and displacing the same which action is considered detrimental to vegetation both directly by uprooting the same and indirectly through the loss of topsoil eroded due to the displacement of the topsoil by the protruding tread of the off road tractor drive wheels which is further exacerbated by the loss of vegetation. It is generally recognized that the degradation of the environment due to the disturbing and loss of topsoil and vegetation during a skidding operation is largely the consequence of utilizing comparatively massive vehicles for economic removal of trees from a harvest site and that the use of protruding tread tires specifically is destructive of the ecosystem dependent upon stationary topsoil.

The loss of topsoil may be of concern to a commercial logging operation but the use of relatively massive vehicles for skidding a dozen trees at a time and requiring tires with protruding tread is considered necessary for economic operation. For a private owner of wooded property, who isn't concerned with the economic benefit of harvesting timber as much as with avoiding disturbance of that property, a much smaller and less intrusive means of skidding just one large tree or several smaller trees at once is considered attractive. The difference between a commercial log skidder and a skidder suited for personal use and the characteristics appropriate to each are thus outlined as prelude to a review of the prior art considered pertinent to the present invention.

DISCUSSION OF THE PRIOR ART

A self powered log skidder of basically conventional type but further possessing a fixed hoist lower than the pivoted hoist with grapple is disclosed in U.S. Pat. No. 3,841,507 issued Oct. 15, 1974 to Barwise for a 'Load Handling Apparatus'. A trailed log skidder of basically conventional type with pivoted hydraulic cylinder operated hoist but further possessing a "superstructure cable bearing such as a roller arrangement or fairlead" utilized in combination with a skidding cable operated by a winch is disclosed in U.S. Pat. No. 4,795,135 issued Jan. 3, 1989 to Scott for a 'Power Driven Trailed Skidder Vehicle'. This latter reference further provides "for power driven operation in coordination with a tractor" which is considered typical of conventional trailed log skidders.

Perhaps the most common or well known use of a trailer mounted hoist is for hauling boats. U.S. Pat. No. 2,571,361 issued to Harmanson discloses a boat trailer and a modified A frame pivoted drum operated hoist with two wheels positioned immediately ahead of the medially located hoist pivot. U.S. Pat. No. 3,625,267 issued to Welborn Dec. 7, 1971 for a 'Stump Removal Machine' discloses a triangular horizontal frame and two rear located wheels which uses a hydraulically positioned chain driven toothed rotor to grind stumps. Neither of these references disclose a skidder but each is in a field peripherally related to the characteristics anticipated of a skidder for personal use as opposed to commercial skidders, both by two wheeled trailer A frame construction and the first utilizing a modified A frame hoist, the second also being concerned broadly with tree removal.

U.S. Pat. No. 3,850,304 issued to Howell discloses a 'Radio Controlled Skyline Skidder' which windrows logs with a yarding operation vehicle riding a cable using a radio controlled winch to pull logs into line with the cable on which the yarding vehicle returns to the yard. U.S. Pat. No. 5,876,019 issued to Morrissey Mar. 2, 1999 discloses a 'Winching Apparatus For All-Terrain Vehicle' intended for assisting in the removal of game from the woods which is fixed to a frame on the ATV, has a manually cranked hoist supported by a pivoted A frame which is secured with a forward guy line when used to hoist the game up. This last reference is not a log skidder but it possesses aspects anticipated in a personal log skidder as discussed above including a hoist and attachment to an ATV which is recognized as an appropriately small four wheel drive vehicle suited to log removal on private property and opposed to commercial logging.

The prior art considered most pertinent to the present invention discloses, in reverse order of the discussion above:
- (a) a pivoted manually cranked hoist attached to an ATV for hoisting game;
- (b) radio control of a winch on a log skidder riding a cable;
- (c) a stump removal machine possessing a substantially triangular frame and two wheels;
- (d) a boat trailer possessing two wheels and a pivoted support hoist;
- (e) a trailed log, skidder with conventional hoist and a "superstructure cable bearing" used in conjunction with a winch operated skidder cable;
- (f) a self powered log skidder with conventional hoist and a secondary fixed support for a winch operated cable.

While many of the above noted elements possessed of the prior art are considered desirable in a light weight log skidder intended to minimize topsoil disruption the prior art fails to disclose any vehicle truly adapted to removal of a log or three without tearing up the topsoil.

The height and pivoted construction prevents the ATV hoist from being capable of skidding a single log. While remote operation of an electric winch is considered a desirable feature, a yarding vehicle adapted to ride a cable during windrowing is wholly inappropriate to removing a tree or three while minimizing property damage. The triangular frame of the stump removal machine is considered a useful aspect to construction of a suitably small log skidder but the machine is incapable of skidding a single log. A hoist and the use of two wheels on a small trailed log skidder is considered desirable but a boat trailer with a pivoted hoist support adapted to haul a boat onto the trailer is otherwise unsuited to log skidding.

Both the trailed and self powered skidders with conventional pivoted hoist supports operated with a hydraulic cylinder discussed possess additional features which are considered to bear a resemblance to features desired in a small trailed log skidder minimizing topsoil disturbance but the conventional aspects are wholly unsatisfactory and neither machine is capable of being used in conjunction with an ATV or other small four wheel drive vehicle as necessary to avoid significant topsoil damage or prohibitive expense to the average property owner.

Statement of Need

Because there is no known small, lightweight, trailed log skidder adapted for use with an ATV or other small four wheeled drive land vehicle which is efficient in facilitating the removal of a log while minimizing topsoil disturbance a need for the same is therefore considered to exist.

SUMMARY OF THE INVENTION

Objects of the Invention

The encompassing object of the present invention is the provision of a small, lightweight, trailed log skidder adapted for use with an ATV or other small four wheeled drive land vehicle which is efficient in facilitating the removal of a log while minimizing topsoil disturbance.

A first auxiliary object of the present invention is the provision of such a small, lightweight, trailed log skidder which can be readily operated by a single individual.

A second auxiliary object of the present invention is the provision of such a small, lightweight, trailed log skidder capable of hoisting the end of twenty inch diameter log and being of sufficiently small overall dimensions and weight as to be readily disposed in the bed of a pick up truck.

A third auxiliary object of the present invention is the provision of such a small, lightweight, trailed log skidder possessing means for the attachment to one end of a load at a height convenient to a single operator and preferably proximate the elevation of a hitch attachment of said skidder with an ATV or other small four wheeled drive land vehicle.

A first ancillary objective of the present invention is the provision of such a small, lightweight, trailed log skidder possessing an electric winch, preferably operable both directly and remotely, readily operated by a single individual.

A second ancillary objective of the present invention is the provision of such a small, lightweight, trailed log skidder suited to use of a pair of grooved tread tires, preferably high pressure, without use of cleated or protruding tread tires.

A third ancillary object of the present invention is the provision of such a small, lightweight, trailed log skidder which is not readily damaged by and does not readily damage a tree in forward collision with the same.

Ancillary objectives of the present invention include the provision of a small, lightweight, trailed log skidder which is of durable and economic construction, which is easily operated and maintained, and which is relatively simple and safe in operation.

Principles Relating to the Present Invention

In fulfillment of the objects and objectives stated above a single axis, preferably two wheeled, trailed skidder possessing a fixed, rigid, substantially vertical, hoist support at the rear is suggested. The hoist is an electric winch preferably operable from a distance via radio frequency signal as well as being directly operable via controls on the winch which winds a lift cable extended through a pulley at the top of the hoist support. The lift cable preferably possesses a hook at the free end which is intended to engage a choker chain about one end of a load of one or more logs.

After elevating this end of the load with the hoist into a suitable position cinching means are employed to take up the load in direct attachment to a pair of lateral load support points possessing a much lower elevation than the pulley from which the load is transferred by slackening the winch after securement of the cinching means. The transfer of the load to the cinching means will tighten the same about the end of the load. A preferred cinching means is comprised of a simple steel chain attached to one of said two lateral load support points and readily attachable to the other load support point with a length suited to encircling that end of the load one and one half times.

A basically triangular construction, preferably in steel weldment, for a substantially horizontal frame is utilized with a forward conventional type hitch and the fixed, rigid, substantially vertical hoist support extending upward from the rear of the horizontal frame positioned preferably proximate the attachment of each wheels's axle. It is further preferred that the base of a triangular horizontal frame extend laterally beyond each wheel so that the simple wedge shape will deflect obstacles such as small trees and prevent the same from getting caught in a wheel. The wheels recommended are of conventional, grooved tread, type, preferably operable with a high pressure such as commonly used on mobile homes.

It is suggested the power source consist of a twelve volt deep cycle battery or a gasoline powered generator. Either a twelve volt DC winch or 115 AC winch is used accordingly. It is suggested that the overall dimensions of the skidder enable disposition of the same in the bed of a conventional pick up truck. Specific construction suggestions enable a skidder of this size weighing about 300 pounds capable of hoisting and skidding a twenty inch diameter tree sixteen feet long.

BRIEF DESCRIPTION OF THE DRAWINGS

FIG. 1 is a plain elevational view taken from the top of a preferred embodiment in accordance with the principles relating to the present invention.

FIG. 2 is a plain elevational view taken from the front of a preferred embodiment in accordance with the principles relating to the present invention.

FIG. 3 is an isometric detail view of the cinching means and wheel positioning on the rear end, taken from a side of a preferred embodiment in accordance with the principles relating to the present invention.

FIG. 4 is a cross sectional view of a log and representation of the preferred manner of utilizing a cinch about the log in accordance with the principles relating to the present invention.

NOMENCLATURE

| | |
|---|---|
| 10 | frame |
| 11 | portable log skidder |
| 12 | hoist |
| 13 | cinch |
| 15 | winch |

-continued

| | |
|---|---|
| 16 | power source |
| 17 | wheels |
| 19 | hitch |
| 20 | arch |
| 21 | lift cable |
| 22 | leg (of arch) |
| 23 | top end (of arch) |
| 25 | snatch block |
| 26 | brace |
| 27 | wheel axle mounting |
| 29 | conventional ball coupler |
| 30 | cinch support points |
| 31 | length of chain |
| 32 | first end of cinch |
| 33 | second end of cinch |
| 35 | cinch cleat |
| 36 | slotted aperture |
| 37 | tire |
| 39 | forward extension (of frame) |
| 50 | winch mount |
| 51 | electric winch |
| 52 | winch drum |
| 53 | roller fairly |
| 55 | wire remote control |
| 56 | solenoid switch |
| 57 | grooved tread |
| 59 | jack |
| 60 | rear extension (of frame) |
| 61 | hook |
| 63 | plate |
| 65 | generator |
| 66 | battery |
| 67 | electric line |
| 69 | pin |
| 70 | log |

DETAILED DESCRIPTION OF THE PREFERRED EMBODIMENTS

A portable log skidder 11 in accordance with the principles relating to the present invention possessing a hoist 12, a cinch 13, a winch 15, a power supply 16, and two wheels 17 mounted to a frame 10 with a frontal hitch 19 is depicted in FIGS. 1–3. The hoist 12 comprises, in a preferred embodiment, a rigid arch 20 fixed in substantially vertical disposition to a horizontal frame 10 having two legs 22 joined at a top end 23 from which a snatch block 25 is suspended and through which a lift cable 21 runs. The winch 15 is comprised of an electric winch 51 possessing a winch drum 52 about which the lift cable 21 is wound in retraction. The cinch 13 is comprised of a length of flexible inextensible material, preferably a length of chain 31, attachable to two lateral cinch support points 30 fixed to the horizontal frame 10 at an elevation well below the snatch block 25, proximate the axis of the wheels 27, but allowing clearance for the end of a load encircled by the cinch 13.

As clearly seen in FIG. 1, the nominally horizontal frame 10 is basically triangular with a forward extension 39 upon which the preferred hitch 19, a conventional ball coupling 29 is mounted. The triangular shape is intended to deflect collisions with standing trees and the base of the triangle shape is preferably disposed, as shown, directly in front of the wheels 17 which, though each has a separate wheel axle mounting 27, are aligned axially with each wheel axle mounting 27 being upon one of two substantially parallel, spaced apart, rear extensions 60 of the frame 10 behind the base of the triangle. This pair of rear extensions 60 also facilitate attachment of each leg 22 of the arch 20 in extension vertically upward, with the frame 10 in a horizontal disposition, from substantially the same longitudinal position as one of the two wheel axle mountings 27. With the legs 22 of the arch 20 and the wheel axle mountings 27 both equidistantly located laterally with respect to a longitudinal center line parallel the forward extension 39 of the frame 10 and with the arch 20 being laterally symmetric with the snatch block 25 centered upon the top end 23, the entire hoist 12 is effectively centered with respect to both wheels 17 and is furthermore substantially coincident with a plane through the common axis of both wheel axle mountings 27.

This arrangement eliminates the possibility of a moment arising between the point at which the load is taken up by the hoist 12, i.e. the snatch block 25, and the two lateral points of contact through which the load is transmitted to the ground, i.e. the bottom of the tires 37. Verticality of the plane through the hoist 12 and the wheel axis mountings 27 ensures stability during operation of the winch 15 and attachment of the cinch 13 to two lateral cinch support points 30 located proximate to both this vertical plane and the horizontal plane through the axis of the wheels 17 ensures stability in skidding a load. It is recommended that the arch 20 be perpendicular with respect to the frame 10 and that the latter be aligned in use with a horizontal plane through the axis of the wheels 17.

In order to maintain a horizontal positioning of the frame 10 during operation a jack 59 is extended downward from the forward end of the frame 10, as clearly seen in FIG. 2, and preferably may be rotated about the mounting to the frame 10 alongside the same, as shown in FIG. 1, in order to obtain better clearance underneath and tighter turning radius in trailing the portable log skidder 11. Either a crank up or crank down jack 59 may be used, preferably of a conventional 'heavy duty' type for light trailer use. It is further preferred that the jack 59 be lockable in both positions. A simple pin 69 passed through aligned holes in the mounting of the jack 59 to the frame 20 will suffice. The hitch 19 may also be comprised of a simple pin passed through aligned holes in overlapping plates and when attached is preferably at the same height as the cinch 13 so that during skidding, if the cinch support points 30 are directly above the axis of the wheels 17, as preferred, a purely horizontal load is placed upon the hitch 19.

The preferred cinch 13, as previously mentioned and depicted in FIGS. 1 & 3, is comprised of a length of chain 31 attachable to two appropriate cinch support points 30. Another type of flexible but inextensible length such as a cable or a belt is considered feasible for use as a cinch 13, but suitable terminations for attachment and means of effective length adjustment will both be required for satisfactory operation. A length of chain 31, being comprised of a plurality of interconnected rigid links each possessing an aperture therethrough, is considered to provide, in attachment to the two lateral cinch support points 30, the best cinch 13 because attachment at variable length is readily facilitated and because the individual links protrude in alternate perpendicular relation thereby providing a good grip of the tree(s) comprising a load. The preferred cinch 13 seen in FIG. 3 utilizes two cinch cleats 35 each comprised of a plate 36 projecting rearward from one of the two legs 22 of the arch 20 and possessing a slotted aperture 36 therethrough. A first end 32 of the length of chain 31 is seen in removable attachment to one cinch support point 30 which attachment is effected by disposition of one link of the length of chain 31 within the slot toward the bottom of the slotted aperture 36. A second end 33 of the length of chain 31 is seen to be free as is the slot toward the bottom of the slotted aperture 36 through the plate 37 comprising the other cinch cleat 35 and also the other cinch support point 30 in this preferred embodiment.

It is emphasized that the preferred cinch 13 detailed in FIG. 3 utilizes a length of chain 31 which may be replaced by any other flexible inextensible length possessing suitable means of length adjustment and attachable to one of the two laterally disposed cinch support points 30. One end may be permanently fixed, if desired, to the other cinch support point 30. Two cinch cleats 35 are suggested, each allowing removable attachment of a flexible inextensible length such as a belt, rope, or, preferably, a length of chain 31. A conventional cleat possessing opposed laterally projecting prongs might readily be employed, particularly in the case of using a rope, and a buckle and clasp might be utilized in the case of a belt as equivalent means of obtaining adjustment of effective length and attachment to the two cinch support points 30.

And the cinch cleats 35 needn't be identical to the cinch support points though this is preferred. A smooth aperture through a plate 63 similar to that depicted in FIG. 3 might be utilized, tough a smooth edged eye hook would be much better, as a cinch support point 30 while a cinch cleat 35 consisting of a hook located below the plate 63 would provide means of removable attachment and effective length adjustment for a length of cinch chain 31 and the same approach readily applied to use of a cable, belt, rope, or any other flexible inextensible length of adjustable effective length supportable by two lateral cinch support points 30 after encircling the end of a load which has been first hoisted into position.

The preferred encirclement of the end of a log 70 is depicted in FIG. 4 in which it is seen that the cinch 13 is comprised of a first end 32 of a length of chain 31 attached to one cinch support point 30 and a free second end 33 of the same which is first passed under the log 70, around the same and back under the log 70 again before attachment to the other cinch support point 30.

In order to hoist the load into position it is recommended that a choker chain (not shown) first be wrapped about the end of the log 70 concerned and hooked with the hook 61 on the end of the sufficiently slackened lift cable 21 which is then retracted by operation of the winch 15. As most clearly seen in FIG. 1 the winch 15 is preferably comprised of an electric winch 51 rigidly affixed upon a winch mount 50 suitably angling the same as shown whereby the lift cable 21 is guided by a roller fairly 53 comprised of two pairs of apposed spaced apart substantially parallel rollers, one pair at either end on top and the other pair laterally disposed below, onto the winch drum 52. Rotational power is imparted to the winch drum 52 by an electric motor within the electric winch 51 supplied from an electric power supply via an electric line 67.

Two electric power supplies, a generator 65, or a battery 66, are considered suitable. The first is depicted in FIG. 1 and is of a conventional gasoline or diesel fuel supplied type generating a standard 115 (+/−5)V alternating current (AC). In this case the electric winch 51 is preferably 115V AC as well. This power supply is considered to be superior to the use of an electric battery 66 in enabling longer operation without the necessity of recharging and in providing greater power so that a larger capacity electric winch 51 may be utilized. However, an electric battery 66, preferably of a rechargeable, deep cycle, type providing 12V direct current (DC), is considered to provide sufficient power for an electric winch 51 of sufficient capacity to hoist a two foot diameter load and this overall capacity is considered to be well suited to a portable log skidder 11 intended to be used by the owner of a wooded lot who is not harvesting trees commercially.

Practically speaking a portable log skidder 11 as described herein possessing a battery 65 will have a sufficient power supply for a full day's work so long as only a few trees per hour are being felled on average which quantity is considered a practical limit if the same trees are being skidded a considerable distance during the operation including felling of the trees being skidded. Alternatively, a portable skidder 11 as described herein supplied with an electric generator 66 and a larger AC electric winch 51 might be utilized almost continuously in hoisting and skidding logs only a short distance but this situation is considered descriptive of a commercial operation utilizing a crew and loading logs onto a large vehicle bed for transport. A suitable electric generator 66 costs at least several times as much as a suitable rechargeable deep cycle battery 65 and the additional cost is considered undesirable and the battery 65 hence actually preferred although the superior capacity offered by the generator 66 is duly recognized.

Regardless of the power supply, the electric winch 51 is supplied with electric current through an electric line 67 which flow is controlled by a power switch, preferably a solenoid switch 56 which facilitates use of a wire remote control 55 for which a length of twelve feet or so is suggested. In the case a rechargeable battery 65 is utilized it is of course necessary to occasionally recharge the battery for which a conventional transformer (not shown) which utilizes standard household (115 V AC) current or 230 V AC if available. And in the case of the generator 66 supplying the electric current for the electric winch 51 appropriate supply with gasoline or diesel fuel is required as well as operation of the generator 66 which is an internal combustion engine, essentially, imparting rotational drive to a rotor which motion relative to a stator produces alternating current taken off the stator.

The wheels 17 are each mounted on a common axis with wheel mountings 27 preferably as described above, separately to one of the two rear extensions 60 of the frame 10, such that both wheels 17 and the tires 37 associated with the same are behind the base of the triangle of the frame 10 as best seen in FIG. 1 and protected thereby during skidding by deflecting the portable log skidder 11 off of standing trees and deflecting shrubs from getting caught in the wheel mountings 27. It is further recommended that the tires 37 possess a grooved tread 57, which is in contrast to a protruding tread, in order to minimize topsoil disturbance. Tires 37 conventionally utilized on large mobile homes with a relatively high pressure rating, i.e. sixty to eighty pounds per square inch gauge (psig) are specifically suggested in order to comfortably carry the combined weight of the portable log skidder 11 and the end of the load (not shown) being hoisted or skidded with a minimum contact surface upon the soil thereby minimizing the area of topsoil affected by passage of the portable log skidder 11 thereabove.

It is hence seen that the portable log skidder 11 described herein is intended to minimize ecological damage in operation, that in addition to the use of smooth or grooved tread 57 tires 37 in contrast to a protruding tread a relatively high pressure enables use of only two tires 37 which minimizes the topsoil area contacted and facilitates minimization of width which minimizes the amount of foliage contacted during skidding. Most importantly, perhaps, the basically triangular frame 10 with rearward extensions 60 for the wheel mountings 27 and the vertical arch 20 prevents foliage from getting caught by the wheels 17 and protects the wheels 17 as well. The distribution of weight under load is considered important and the extension of the arch 20 upward above the axis of the wheels 17 ensures that the load is hoisted without creating a moment with regard to the points of contact with the ground made by the tires 37. Location of the cinch support points 30 proximate a vertical plane through the axis of the wheels 17 ensures that the load may be skidded without creating a similar moment.

It is also considered important that the portable log skidder 11 as described herein be of sufficiently compact dimensions overall to be loaded upon the bed of an average size pick up truck, or otherwise the term 'portable' is denied substantive meaning. The height of the hoist 12 is relatively unimportant but the width and length of the frame 10 including the forward extension 39 and hitch 19 thereupon is considered determinative. In order to ensure the strength required of the hoist 12 and in order to maintain a compact width and length overall of the frame 10 it is recommended that each leg 22 of the arch 20 possess a brace 26 rigidly disposed between a medial portion of each leg 22 and the rear base of the triangle of the frame 10, as best seen in FIG. 2, and that the winch mount 50 not only angle the electric winch 51 as earlier described but also include a brace 26 rigidly disposed between the front apex and rear base of the basic triangle of the frame 10, as best seen in FIG. 1. And with regard to the general construction welded steel lengths of channel stock, preferably rectangular cross sectioned closed box type as shown in the figures attached hereto, is specifically recommended with use of conventional hardware and as depicted.

The foregoing is intended to provide one practiced in the art with what is considered to constitute the best known manner of making and using an embodiment in accordance with the principles relating to the present invention and is not intended in any manner and is not to be interpreted in any manner as restricting either the scope of the invention or the rights and privileges obtained by the granting of Letters Patent in protection of the same for which I hereby claim:

1. A portable trailed log skidder intended for transporting in the bed of a conventional pick up truck and to be trailed by an all terrain vehicle (ATV) or other relatively small four wheel drive vehicle, said log skidder comprising:
    a substantially rigid frame with a generally triangular shape having a forward apex and a rear base, a hitch, a hoist, a winch, a power source, two wheels, and a cinch;
    said hitch being located upon a front end of said frame and permitting removable attachment to a hitch located on the back of an ATV or other relatively small four wheel drive vehicle;
    said hoist being comprised of a rigid arch possessing two legs fixed to a rearward end of said frame and extending upward therefrom being joined to each other in a top end of said arch from which a snatch block is suspended and through which a lift cable possessing a hook upon a free end is passed, said lift cable further possessing another end retractable by said winch;
    said winch being comprised of an electric winch possessing a drum about which said lift cable is wound in operation wherein electric current through an electric line from said power supply is supplied to an electric motor which imparts rotation to said drum;
    said two wheels being mounted to said rearward end of said frame and axially aligned underneath said legs of said arch;
    said cinch comprising a flexible inextensible length possessing two ends each attachable to a one of a pair of spaced apart cinch support points laterally fixed to said rearward end of said frame at an elevation considerably lower than the elevation of said top end of said arch and encircling a suitably positioned end of at least one log;
    whereby a load comprised of one end of at least one log may be grasped with a choker chain which, engaged by said hook, will lift said load with operation of said winch in retraction of said lift cable to a suitable position for securement of said cinch about said load after which slackening of said lift cable transfers the weight of said load from the top end of the arch through said snatch block to said pair of spaced apart cinch support points thereby lowering the center of gravity of said load and disposing the same closer to said common axis of said two wheels thereby facilitating skidding of said load during trailing with said hitch.

2. The log skidder of claim 1 wherein said winch includes a roller fairly through which said lift cable is guided.

3. The log skidder of claim 1 wherein said electric winch is operable with use of a solenoid switch permitting operation by wire remote control.

4. The log skidder of claim 1 wherein said hitch is located upon a forward extension of said frame.

5. The log skidder of claim 1 wherein said hitch is of a conventional ball type.

6. The log skidder of claim 1 further possessing a jack mounted upon said forward end of said frame.

7. The log skidder of claim 6 wherein said jack is pivotable between perpendicular and parallel positions with respect to said frame.

8. The log skidder of claim 1 wherein said power supply is comprised of a generator.

9. The log skidder of claim 8 wherein said electric winch is operable upon AC.

10. The log skidder of claim 1 wherein said power supply is comprised of a rechargeable battery.

11. The log skidder of claim 10 wherein said electric winch is operable upon 12V DC.

12. The log skidder of claim 1 wherein said wheels possess grooved tread tires.

13. The log skidder of claim 12 wherein said tires possess a pressure rating between 60 and 80 psig.

14. The log skidder of claim 1 wherein said rearward portion of said frame includes two substantially rigid rearward extensions.

15. The log skidder of claim 14 wherein each end of both said wheels are separately mounted upon one of said two rearward extensions.

16. The log skidder of claim 14 wherein each of both said legs of said arch extend upward from one of said two rearward extensions.

17. The log skidder of claim 16 further possessing a substantially rigid brace between a medial portion of each said leg of said arch and said rear base of said frame.

18. The log skidder of claim 14 wherein at least one of said two cinch support points is provided by a cinch cleat located upon one of said legs of said arch.

19. The log skidder of claim 18 wherein said flexible inextensible length of said cinch is comprised of a length of chain.

20. The log skidder of claim 19 wherein at least one said cinch cleat is comprised of a rearwardly projecting member possessing a slot in which one link of said length of chain is securable.

21. The log skidder of claim 20 wherein said slot is peripherally located upon an aperture through said rearwardly projecting member.

22. The log skidder of claim 21 wherein said rearwardly projecting member is comprised of a plate.

* * * * *